United States Patent
Gouaillier et al.

(10) Patent No.: US 9,555,543 B2
(45) Date of Patent: Jan. 31, 2017

(54) ROBOT WITH JOINTS OF VARIABLE RIGIDITY AND METHOD FOR CALCULATING SAID OPTIMIZED RIGIDITY

(75) Inventors: David Gouaillier, Montrouge (FR); Cyrille Collette, Le Plessis Robinson (FR)

(73) Assignee: ALDEBARAN ROBOTICS, Paris (FR)

(*) Notice: Subject to any disclaimer, the term of this patent is extended or adjusted under 35 U.S.C. 154(b) by 285 days.

(21) Appl. No.: 14/236,802

(22) PCT Filed: Aug. 3, 2012

(86) PCT No.: PCT/EP2012/065210
§ 371 (c)(1),
(2), (4) Date: Apr. 11, 2014

(87) PCT Pub. No.: WO2013/017676
PCT Pub. Date: Feb. 7, 2013

(65) Prior Publication Data
US 2015/0343633 A1    Dec. 3, 2015

(30) Foreign Application Priority Data

Aug. 4, 2011   (FR) ...................................... 11 57171

(51) Int. Cl.
*G05B 15/00*    (2006.01)
*G05B 19/00*    (2006.01)
(Continued)

(52) U.S. Cl.
CPC ............... *B25J 9/16* (2013.01); *B62D 57/032* (2013.01); *G05B 13/04* (2013.01); *G05B 13/041* (2013.01);
(Continued)

(58) Field of Classification Search
CPC .......... B25J 9/16; B62D 57/032; G05B 13/04; G05B 13/041; G05B 19/19; G05B 19/4062; G05B 2219/3926
See application file for complete search history.

(56) References Cited

U.S. PATENT DOCUMENTS 5,719,479 A * 2/1998 Kato ...................... G05B 19/19
                                               318/563
2004/0205417 A1  10/2004 Moridaira et al.
(Continued)

FOREIGN PATENT DOCUMENTS

| EP | 1486298 A1 | 12/2004 |
| EP | 2347868 A1 | 7/2011 |
| WO | 2009124955 A2 | 10/2009 |

OTHER PUBLICATIONS

L. Sentis et al., "Prioritized Multi-Objective Dynamics and Control of Robots in Human Environments", IEEE Humanoid Robots, Nov. 2004, vol. 2, No. 10, pp. 764-780.
(Continued)

*Primary Examiner* — Jerrah Edwards
*Assistant Examiner* — Rachid Bendidi
(74) *Attorney, Agent, or Firm* — Baker Hostetler LLP

(57) ABSTRACT

A jointed robot capable to move on a surface is provided. It is known to limit to a predefined fixed value the torque that the motors of the joints of the robot can develop. A rigidity coefficient corresponding to the limit torque is calculated by solving a dynamic equilibrium model of the robot. The contact points of the characteristic effectors are determined by a selection from a list of potential effectors, notably as a function of a criterion of distance from a virtual ground plane. The contact forces for said effectors are calculated by optimal resolution of the equilibrium equations. Finally the torques applied in the dynamic equilibrium model of the
(Continued)

robot and the coefficients of corresponding rigidity are calculated.

12 Claims, 8 Drawing Sheets

(51) Int. Cl.
    *B25J 9/16* (2006.01)
    *G05B 19/19* (2006.01)
    *G05B 13/04* (2006.01)
    *B62D 57/032* (2006.01)
    *G05B 19/4062* (2006.01)

(52) U.S. Cl.
    CPC .......... *G05B 19/19* (2013.01); *G05B 19/4062* (2013.01); *G05B 2219/39261* (2013.01)

(56) References Cited

U.S. PATENT DOCUMENTS

| | | | | |
|---|---|---|---|---|
| 2006/0247904 | A1* | 11/2006 | Dariush | B62D 57/032 703/11 |
| 2008/0258670 | A1* | 10/2008 | Yoshikawa | G05B 19/40 318/568.22 |
| 2011/0077775 | A1* | 3/2011 | Nagasaka | B25J 13/085 700/254 |
| 2011/0178639 | A1* | 7/2011 | Kwon | B62D 57/032 700/261 |
| 2013/0218345 | A1* | 8/2013 | Lee | B25J 9/162 700/261 |

OTHER PUBLICATIONS

R. Murray et al., "A Mathematical Introduction to Robotic Manipulation", CRC Press, 1994, 471 pages

* cited by examiner

Evolution of the temperature
according to the prior art

Evolution of the temperature
according to an embodiment
of the invention

Evolution of the temperature according to the prior art

Evolution of the temperature according to an embodiment of the invention

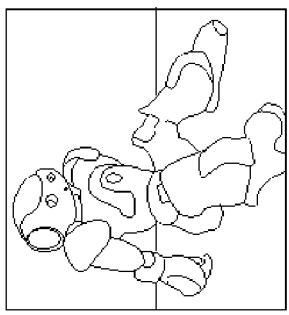
FIG.8a
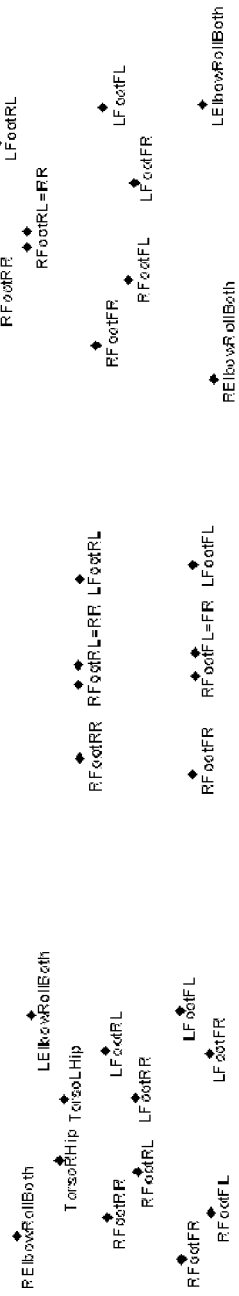
FIG.8b
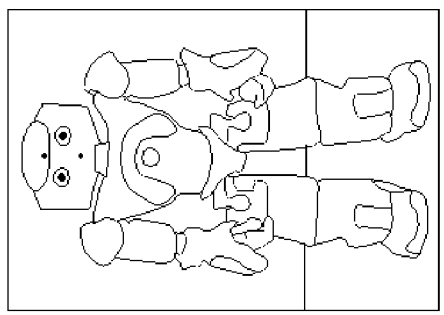
FIG.8c
FIG.8d
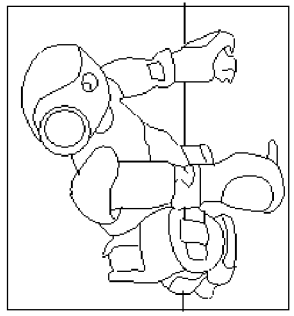
FIG.8e
FIG.8f

ROBOT WITH JOINTS OF VARIABLE RIGIDITY AND METHOD FOR CALCULATING SAID OPTIMIZED RIGIDITY

CROSS-REFERENCE TO RELATED APPLICATIONS

This application is a National Stage of International patent application PCT/EP2012/065210, filed on Aug. 3, 2012, which claims priority to foreign French patent application No. FR 1157171, filed on Aug. 4, 2011, the disclosures of which are incorporated by reference in their entirety.

FIELD OF THE INVENTION

The present invention belongs to the field of jointed robots able to move on a surface. More precisely, it applies to the control of the rigidity of the joints of said robot, said rigidity constituting at one and the same time a significant factor in the ergonomics of interaction with the robot and a limiting factor in the duration and reliability of its use.

BACKGROUND

An exemplary jointed robot is a humanoid robot, that is to say one possessing certain attributes of the appearance and functionalities of man: a head, a trunk, two arms, two hands, two legs, two feet, etc. Over and above appearance, the functions that a humanoid robot is capable of fulfilling will depend on its ability to perform movements, to speak and to "reason". Some humanoid robots are capable of walking, of making gestures, with the limbs or with the head. The complexity of the gestures that they are capable of performing is ever increasing. Some robots of this type such as NAO™ developed and marketed by the applicant, may possess tens of joints whose movements are actuated by electric motors. The command-control logic of said motors determines at one and the same time the rigidity of the joints and the electrical consumption (and therefore the evolution of the temperature) of the robot. It is thus one of the determining elements in respect of the safety of the robot (impact on stability), the possible duration of its use (compulsory shutdown onwards of a limit temperature) and the experience felt by a user in his interaction with the robot, too great a rigidity of the articular chains distancing the robot from an ideal humanoid type. A problem area of the same type is also present in respect of other types of robots, non-humanoid, such as animal robots or more generally robots comprising jointed chains.

The command-control logic can use setpoints of position of the joint (generally based on angle), of velocity of the joint (derivative of the angle) and/or of torque. Such logic is controlled by sensors and may or may not comprise feedback loops making it possible to guide convergence toward the setpoint. Command-control using a torque setpoint or current setpoint is the most expensive and the least widespread. Indeed, it is in this case necessary to use an accurate sensor for the value of the current, and this will be expensive, notably in the case where the number of joints is very high.

Jointed-chain robots may have a fixed base, such as for example industrial jointed arms, notably to carry out assembly tasks. This then entails objects whose unit cost price may be as much as a few tens or hundreds of thousands of euros, with a still small number of joints. In this case, torque-based command-control logic may be suitable insofar as the unit cost price is not the main consideration.

In the case of jointed-chain robots with mobile base, that is to say not fixed to the ground, a category to which humanoid robots belong, the number of joints being higher and the cost price constraint very significant, use is generally made of command-control logic for the joints based on position and/or angular velocity which is much less expensive for a given level of accuracy. However this command-control logic has several significant drawbacks, notably the fact that, if an obstacle prevents the motor from attaining the constraint defined by a target position, the motor will continue to want to attain the position, unattainable in reality, and therefore in so doing will consume electricity and raise the temperature of the joint and of the whole until it causes disabling of the robot in order to avoid damage thereto. This problem is all the more troublesome as a simple lack of horizontality of the feet of the robot when standing upright suffices to trigger the phenomenon of overheating.

To cope with problems of this type, it is known from earlier versions of NAO™ to define a rigidity parameter for each joint which makes it possible to limit the torque applied to the latter to a level substantially lower than the physical limits defined by the constructor, so as to reduce the occurrences of setting to safety mode. However, this solution does not make it possible to avoid overconsumption of energy, notably when one of the chains of the robot encounters an obstacle on its travels. Indeed, a uniform limitation, necessarily fixed at a relatively high level to avoid overly frequent shutdowns, will not allow early interruption of the consumption of the joints in question.

It is also known, notably from patent application US2008/258670, to calculate a value of torque to be applied to a joint and to convert it into an angular velocity setpoint. However, no account is taken in this embodiment of the reaction forces at the points of contact of the robot with its environment, said forces being the main origin of applications of overly high torques which generate overheating.

SUMMARY OF THE INVENTION

The present invention solves this problem by affording means for varying the rigidity of the joints of the chains of the robot as a function of the forces applied to said robot at the points of contact with its environment.

For this purpose, the invention discloses a robot with capabilities of displacement on at least one jointed chain comprising at least one sensor of contact of the end of said chain with the displacement surface, said chain comprising at least one joint, said joint driven by an electric motor controlled by an order determined based on position and/or velocity and by means for limiting the current and/or the torque applied to said motor, said robot being characterized in that said limiting means are controlled as a function of the torque applied to said at least one joint, said torque being calculated as a solution of an equation modeling the dynamic equilibrium of the robot between, on the one hand, the sum of the difference of the inertial forces due to the angular acceleration of the joint and of the gravitational acceleration and of the effect of the Coriolis and centrifugal forces and, on the other hand, the sum of the torque and of the contact, friction and perturbation forces, said torque and force being applied to said joint, a part at least of the effects of the inertial forces due to the angular acceleration of the joint, of the Coriolis and centrifugal forces and of the friction forces being modeled by an offset.

Advantageously, said offset varies according to the posture of the robot.

Advantageously, the effect of the gravitational acceleration is calculated on the basis of a matrix of inertia coefficients dependent on the configuration of the robot and applied to the articular angles and of the gravity vector determined by combining measurements of an inertial platform of the robot.

Advantageously, for the calculation of the gravity vector, a disambiguation is carried out by determining the orientation in space of a central chain of the robot by solving for the position of effectors affixed to said chain.

Advantageously, the points of application of the contact forces taken into account in the dynamic equilibrium model of the robot are determined by generating a first list of effectors satisfying a criterion chosen from a group of criteria comprising a list of on/off states of contact sensors positioned on said effectors, a list of thresholds of minimum distance with respect to the virtual ground plane of said effectors and any combination of said lists, said criteria being substantially determined by the morphology of the robot.

Advantageously, the effectors of the first list are filtered into a second list by comparing the current posture of the robot with standard postures stored in the robot configuration data, said standard postures determining a standard list of effectors, said second list comprising only the effectors of the list corresponding to the standard posture adopted as the closest to the current posture of the robot according to a similarity criterion, if it exists, and only these.

Advantageously, the contact forces at the application points are determined by searching for a substantially optimal solution to the equilibrium equation between the sum of said contact forces and the weight of the robot, and of the vertical component of the perturbation forces.

Advantageously, the perturbation forces are neglected.

The invention also discloses a method for limiting the torque and/or the current applied to an electric motor for driving a joint of a robot with capabilities of displacement on at least one jointed chain comprising at least one sensor of contact of the end of said chain with the displacement surface, said chain comprising at least one joint, said electric motor being controlled by an order determined based on position and/or velocity, said method being characterized in that said limiting takes place by determining a calculated torque value which is applied to said joint, said torque being calculated as a solution of an equation modeling the dynamic equilibrium of the robot between, on the one hand, the sum of the difference of the inertial forces due to the angular acceleration of the joint and of the gravitational acceleration and of the effect of the Coriolis and centrifugal forces and, on the other hand, the sum of the torque and of the contact, friction and perturbation forces, said torque and force being applied to said joint, a part at least of the effects of the inertial forces due to the angular acceleration of the joint, of the Coriolis and centrifugal forces and of the friction forces being modeled by an offset.

Finally the invention discloses a computer program comprising program code instructions allowing the execution of the method of claim 10 when the program is executed on a computer, said program being adapted for limiting the torque and/or the current applied to an electric motor for driving a joint of a robot, said robot being with capabilities of displacement on at least one jointed chain comprising at least one sensor of contact of the end of said chain with the displacement surface, said chain comprising at least one joint, said electric motor controlled by an order determined based on position and/or velocity, said program comprising a module for limiting the torque and/or the current applied to said motor, said program being characterized in that said limiting module is able to execute said limitation as a function of the torque applied to said at least one joint, said torque being calculated as a solution of an equation modeling the dynamic equilibrium of the robot between, on the one hand, the sum of the difference of the inertial forces due to the angular acceleration of the joint and of the gravitational acceleration and of the effect of the Coriolis and centrifugal forces and, on the other hand, the sum of the torque and of the contact, friction and perturbation forces, said torque and force being applied to said joint, a part at least of the effects of the inertial forces due to the angular acceleration of the joint, of the Coriolis and centrifugal forces and of the friction forces being modeled by an offset.

The solution of the invention makes it possible to very appreciably reduce the overconsumption of energy and overheating. The embodiments implemented achieve almost a halving of the temperature rise due to operation of the joint motors at too high a torque. For highly worked joints, such as the ankle, the duration of operation before setting to safety mode may be quadrupled.

The total energy consumption and total lifetime of the robot are therefore greatly improved.

Furthermore, the algorithms used are moreover not very greedy in terms of calculation resources (less than 3% on a processor of Geode™ type from the company AMD (32 bits, 500 MHz).

Finally, the introduction of a parametrization of the rigidity of the joints, which remains disengageable, makes it possible to accommodate users' preferences and to introduce variants according to the types of posture of the robot, thereby making it possible to enrich users' experiences of interaction with the robots.

BRIEF DESCRIPTION OF THE DRAWINGS

The invention will be better understood and its various characteristics and advantages will emerge from the description which follows of several exemplary embodiments and its appended figures in which:

FIGS. 8a to 8f represent a robot in three postures, with determination of the contact points according to an embodiment of the invention;

DETAILED DESCRIPTION

Figure 1:
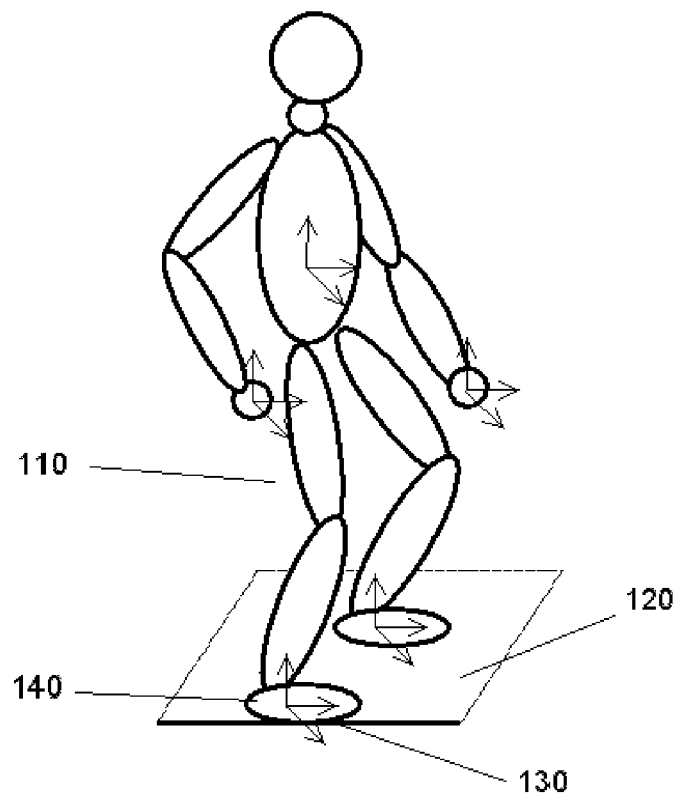
FIG. 1 illustrates a robot symbolized by jointed chains.

FIG. 1 illustrates a robot symbolized by jointed chains.

The robot 100 of the example illustrated comprises five jointed chains, a chain 110 corresponding to the right leg, composed of several segments (thigh, leg, foot). The robot is able to move on a surface 120. It comprises at least one joint 140, in this example the ankle. A robot such as NAO™ already cited comprises 25 joints, this exemplary embodiment not being in any way limiting.

The robot will comprise as a general rule sensors 130 of contact of the foot with the surface 120. These sensors can for example be FSRs (ground pressure sensors). These FSRs are particularly useful in the implementation of the present invention. They are intended within this framework to detect the contact of each of the feet with the ground or any other surface on which the robot is progressing. With this aim it is possible to use, for example, FlexiForce™ (tradename) sensors from the company Tekscan™ which consist of a strip with at least two layers of flexible piezo-resistive material. The electrical resistance of the strip decreases as a function of the vertical pressure force applied to the surface on which the strip is disposed. Measurement of the current makes it possible to determine the pressure force after calibration. Several sensors, for example four, are advantageously provided on the sole of each foot.

Figure 2:
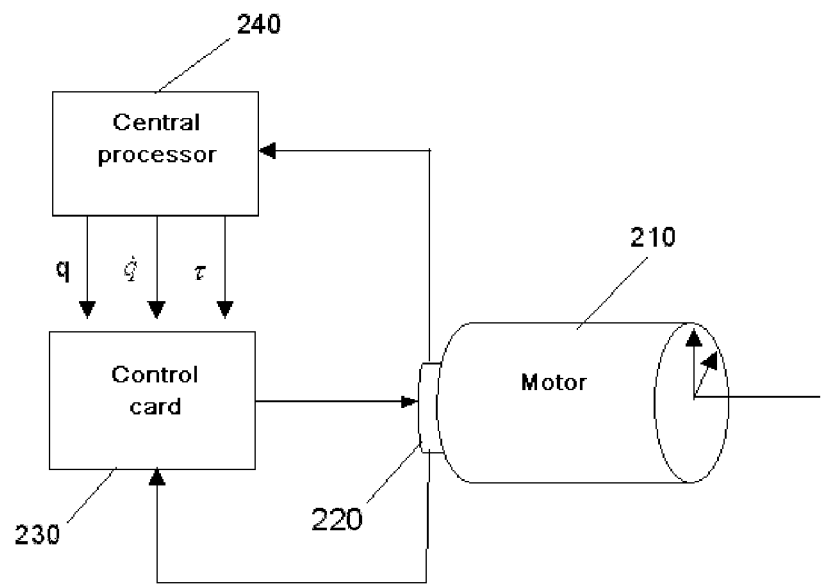
FIG. 2 illustrates the general principle of the command-control of a joint motor of a robot according to the prior art.

FIG. 2 illustrates the general principle of the command-control of a joint motor of a robot according to the prior art.

A robot such as NAO™ comprises about two dozen electronic cards for driving sensors and actuators which control the joints. A joint normally has at least two degrees of freedom and therefore two motors 210. Each motor is controlled in terms of angle by the control variable q. The joint also comprises several position sensors, 220, notably MREs (Magnetic Rotary Encoders). The electronic control card 230 comprises an off-the-shelf microcontroller. This may be for example a DSPIC™ from the company Microchip. This is a 16-bit MCU coupled to a DSP. This MCU has a looped servocontrol cycle of one ms.

The card 240 executes the high-level functions which allow the robot to accomplish the missions assigned to it. The processor of the card can be an off-the-shelf processor x86. A low-consumption processor will be chosen by preference, such as the Geode™ from the company AMD (32 bits, 500 MHz). The card also comprises a set of RAM and flash memories. This card also manages the robot's communications with the exterior (server of behaviors, other robots etc.), normally on a WiFi, WiMax, transmission layer, optionally on a public network for mobile data communications with standard protocols optionally encapsulated in a VPN. The processor is normally controlled by a standard OS thereby making it possible to use the usual high-level languages (C, C++, Python, etc.) or the specific languages of artificial intelligence such as URBI (specialized programming language for robotics) for programming the high-level functions.

Traditionally an electric motor can be driven by an order determined based on angle or position, q, angular velocity, $\dot{q}$, and/or torque, $\tau$, torque-based drive usually being replaced with current-based drive. Indeed, we have the canonical relation: $\tau = k_c I$, I being the intensity of electric current supplied to the motor, $k_c$ being a constant, at least in certain operating spans. It is much easier to measure a current than to measure a torque, torque sensors being very sensitive to drifting. However, even control based on current is uncommon in robots having a large number of motors. Indeed, control based on current requires very fast looped servocontrol cycles (of the order of ten microseconds) and a current sensor able to determine the direction of said current, which are incompatible with low-cost electronic control cards.

A drawback of this approach is that a position setpoint which may not be executed because of an undetected obstacle will produce a very high torque applied to the motor, therefore a high current, hence very appreciable heating, and electrical overconsumption, or indeed breakage of the motor and/or of the joint. These drawbacks significantly reduce the duration of possible operation of a robot.

To overcome this drawback, it is possible to introduce measurements for limiting the torque applied to the joint. These measurements can be mechanical (for example of the wheels with disengageable gearings) or software, by introducing into the motor drive circuit a rigidity coefficient which plays the role of a clutch-like engagement and which can take a value lying between 0.0 and 1.0. When this rigidity coefficient is equal to 1, the motor is able to develop the maximum permitted torque. The latter can advantageously be fixed at a value substantially less than the value indicated by the supplier to avoid overheating. For example, in the case of NAO where the motors of the joints develop a maximum torque of the order of 5 to 6 Nm, the permitted torque at maximum rigidity is 3.2 Nm. When this coefficient is equal to zero, the motor is disengaged and the joint can swing freely. Consequently, the robot falls etc. The procedure for setting to safety mode provides that all the rigidity coefficients, or only some of them, go from 1 to 0 when the local or total temperature exceeds a threshold value. The robot is then no longer usable.

Figure 3:
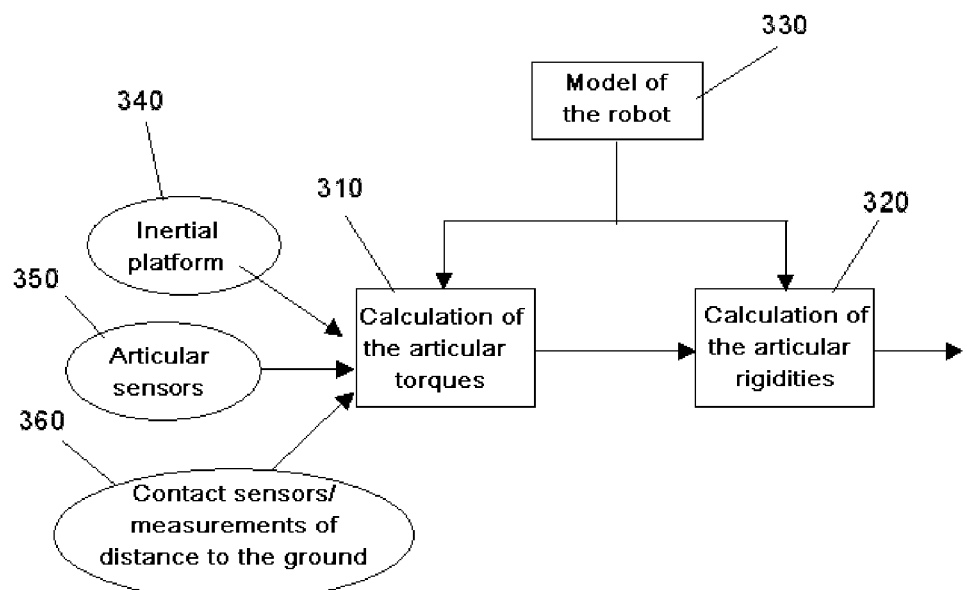
FIG. 3 illustrates a general flowchart of the command-control processing for a joint motor of a robot according to an embodiment of the invention.

FIG. 3 illustrates a general flowchart of the command-control processing for a joint motor of a robot according to an embodiment of the invention.

According to the principle of the invention, this entails calculating a value of the torques to be applied to each joint so as thereafter to vary the rigidity coefficient of said joints in such a way as to ensure equilibrium of the robot.

Figure 6:
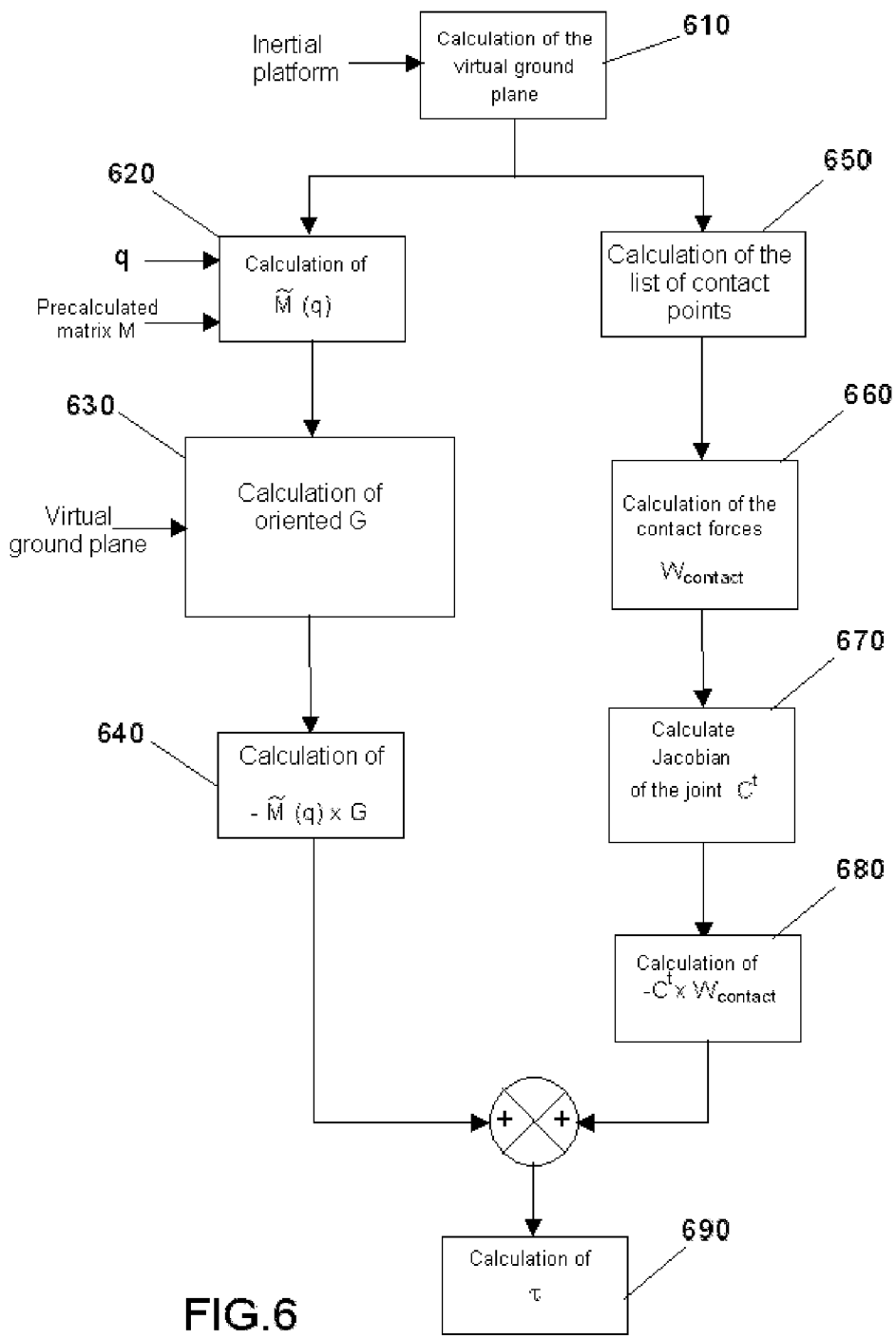
FIG. 6 is a flowchart of certain steps of the command-control processing for a joint motor of a robot according to an embodiment of the invention.
Figure 7:
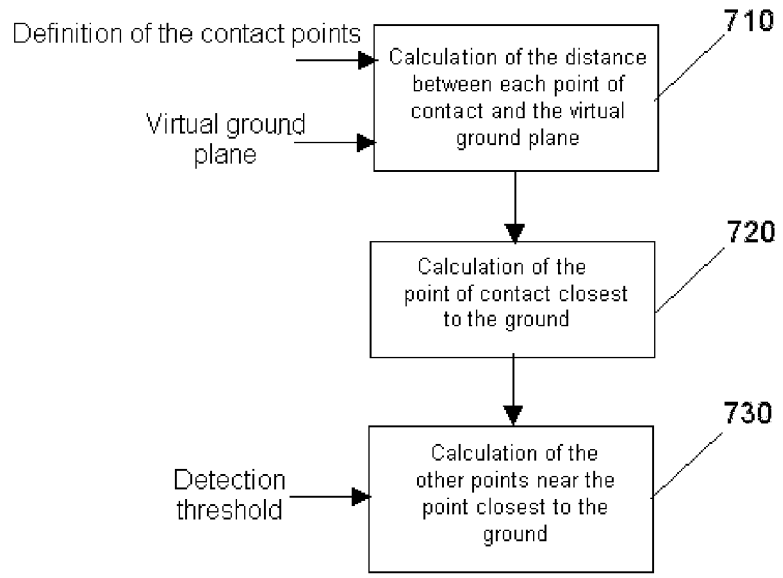
FIG. 7 is a first detail view of a step of the flowchart of FIG. 6.

A module, 310, calculates the articular torques on the basis of a descriptive model of the dynamics of the robot which will be detailed further on in the description in conjunction with FIGS. 6 and 7. It is supplied on the one hand with permanent configuration data for the robot, 330 and, on the other hand, with instantaneous data arising from an inertial platform, 340, from articular sensors, 350, and from contact sensors or methods for measuring distance to the ground, 360. The torque values are thereafter provided to a module, 320, for calculating the articular rigidity coefficients.

The robot's configurations data, 330, consist in essence, in order to implement the present invention, of an inertia matrix M of all the bodies of the robot in their own reference frame. The bodies of the robot are its various physical constituents: the head, the neck, the torso (central chain), the arms, forearms and hands (upper lateral chains), the thighs, legs and feet (lower lateral chains). Each of the bodies has a mass matrix M of dimension (6,6) giving the mass of the body and its moments of inertia.

The moments of inertia being invariants, the matrix M can be calculated in advance, on initialization of the robot as a function of the configuration of the robot. One of the particular features of NAO is indeed to permit a change of the physical constituents of the robot, the configuration data being calculated upon each initialization.

Figure 10:
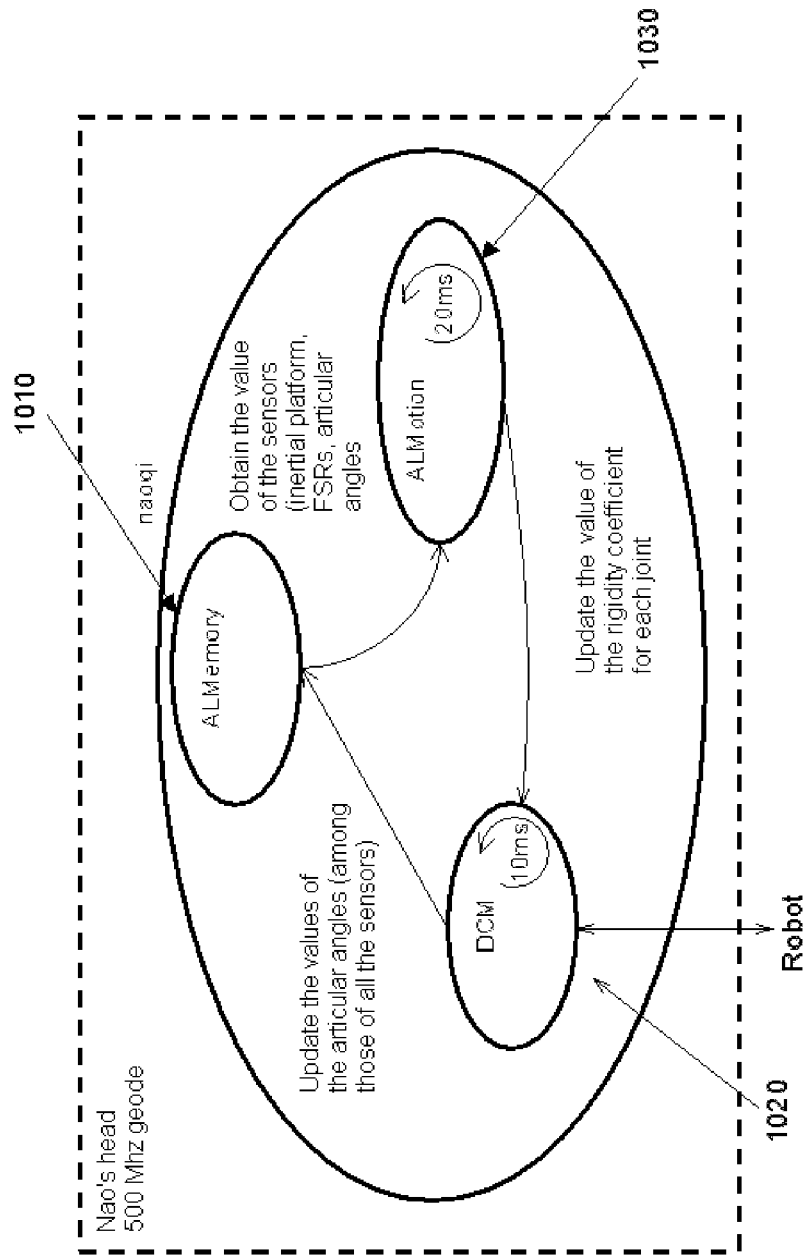
FIG. 10 is a diagram of a physical and functional architecture allowing the implementation of the invention in several of its embodiments.

Thus, we have a set of matrices M, each matrix is stored in a module ALMotion (see further on in the description the comments in conjunction with FIG. 10). A matrix M has the following form:

$$M = \begin{bmatrix} M_{root} & 0_{6,6} & \cdots & 0_{6,6} \\ 0_{6,6} & M_1 & \cdots & \cdots \\ \cdots & & & 0_{6,6} \\ 0_{6,6} & & 0_{6,6} & M_{ndof} \end{bmatrix} \text{ with}$$

$$M_i = \begin{bmatrix} m_i I_3 & 0_{3,3} \\ 0_{3,3} & \mathfrak{J}_i \end{bmatrix}$$

We have put:
$m_i$=mass of the body i;
$\mathfrak{J}_i$=inertia matrix of the body i expressed at its center of mass and in the body's own reference frame;
$I_3$=3×3 identity matrix $$I_3 = \begin{bmatrix} 1 & 0 & 0 \\ 0 & 1 & 0 \\ 0 & 0 & 1 \end{bmatrix}$$

In the case of a robot arm having a fixed base, the root body is generally fixed to the ground. In the case of a robot with traveling base (not fixed to the ground), the root body is not fixed. It is free and it is determined by the system.

The inertial platform, 340, generally consists of a gyrometer and an accelerometer. It provides its measurements to the module 310.

The articular sensors, 350, are generally MREs, as indicated hereinabove. They provide the module 310 with the values of articular angles.

The contact sensors, 360, make it possible to determine the positions of characteristic points, generally dubbed effectors, with respect to a given datum, the terrestrial datum or the displacement surface (the ground for example). The FSRs implanted under the soles of the feet are contact sensors. It is possible to envisage implanting FSRs, or contact sensors of another type, on other parts of the jointed chains of the robot, for example the buttocks, the elbows, the back etc. Physical contact sensors are however of relative reliability. It is possible to achieve the same result (determine whether there is contact with the surface of the ground), by ascertaining all the values of articular angles and the position and the orientation of the root body in space. The position and the orientation of the root body in space are determined by the FSRs and the inertial platform. On the basis of the values of articular angles and of the position and orientation of the root body in space, it is possible for the position of all the bodies of the robot in space to be calculated by direct geometry.

The module 320 is configured to calculate the rigidity coefficients of each of the joints. The torques of each of the joints are provided as input to the module 320. The module divides the torque of each of the joints by the maximum torque so as to deduce therefrom the values of the rigidity coefficients to be applied to each of the joints. According to the effects which are taken into account in the robot's dynamic description model which determines the outputs of the module 310, provision may be made in the module 320 to add an offset to the rigidity coefficient. This offset may be a constant, a set of values dependent on types of postures or contexts of employment of the robot, said values being able to be tabulated, or a variable for which an evolution law is defined.

Figure 4A:
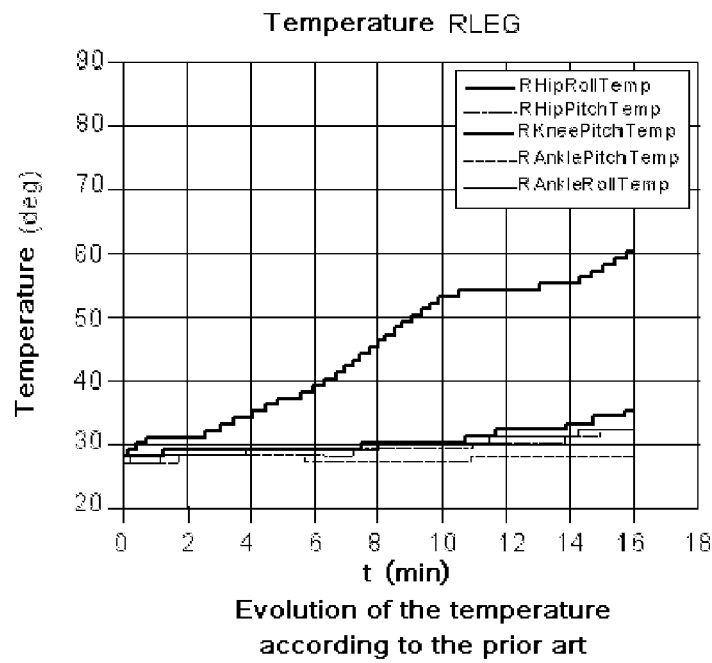
FIGS. 4a and 4b represent the evolution over time of the temperatures of the joints of the right leg of a robot, respectively according to the prior art and according to an embodiment of the invention.
Figure 4B:
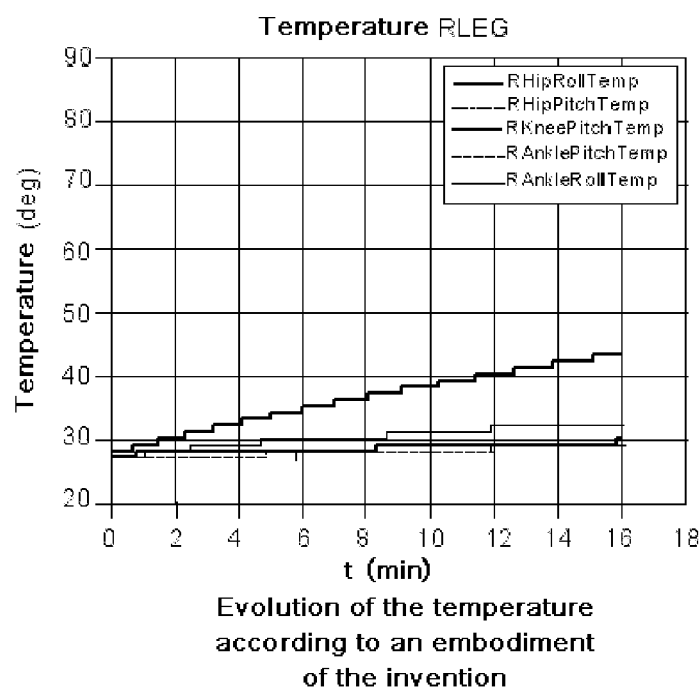

FIGS. 4a and 4b represent the evolution over time of the temperatures of the joints of the right leg of a robot, respectively according to the prior art and according to an embodiment of the invention.

Experiments have been conducted with physically identical robots, the only difference between the experiments recounted respectively by FIG. 4a and by FIG. 4b being that in the first case the configuration of the robot does not include the means of implementation of the invention, whereas, in the second case, it does include them.

In both cases, the robot has been placed in a standing initialization position (PoseInit).

In each of FIGS. 4a and 4b are represented the evolution of the temperature of each of the articular motors of the right lower articular chain, without and with implementation of the invention:

The curves RHipRollTemp represent the evolutions of the temperature of the roll joint of the right hip;
The curves RHipPitchTemp represent the evolutions of the temperature of the pitch joint of the right hip;
The curves RKneePitchTemp represent the evolutions of the temperature of the pitch joint of the right knee;
The curves RAnkleRollTemp represent the evolutions of the temperature of the roll joint of the right ankle;
The curves RAnklePitchTemp represent the evolutions of the temperature of the pitch joint of the right ankle.

Noted particularly is the very appreciable difference in the temperatures at the end of the experiment (about 15 minutes) on the pitch joint of the right hip, which reaches 60° C. in the first case and 42° C. in the second case. The overall increase in temperature of the right leg is 50° C. in the first case and 28° C. in the second case.

Figure 5A:
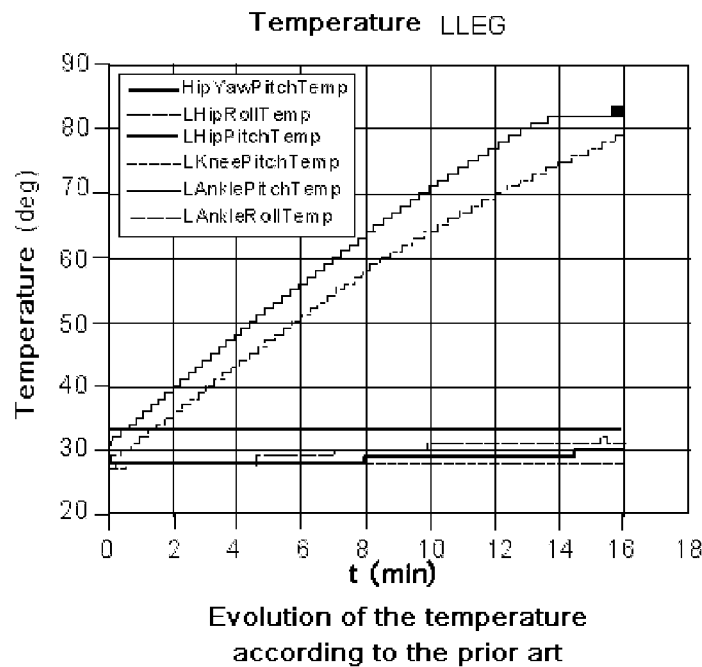
FIGS. 5a and 5b represent the evolution over time of the temperatures of the joints of the left leg of a robot, respectively according to the prior art and according to an embodiment of the invention.
Figure 5B:
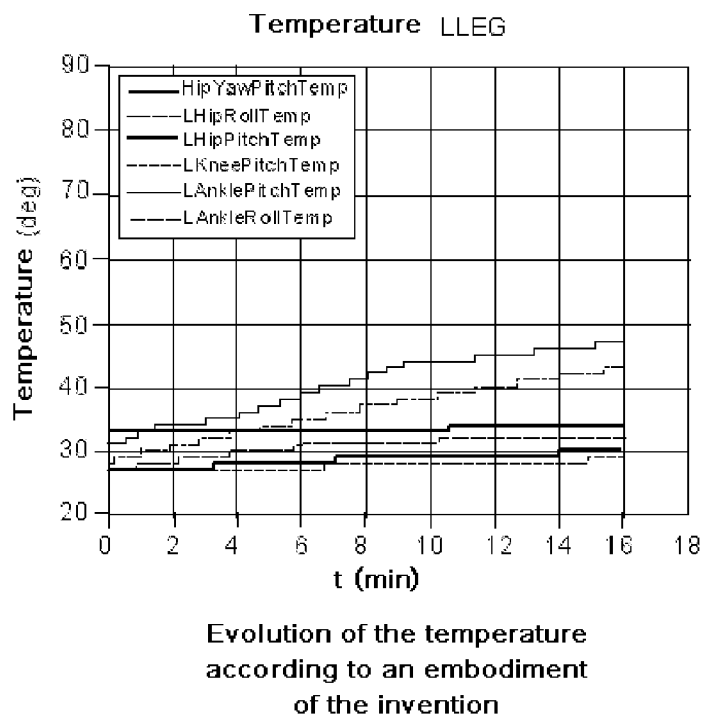

FIGS. 5a and 5b represent the evolution over time of the temperatures of the joints of the left leg of a robot, respectively according to the prior art and according to an embodiment of the invention.

The conditions of the experiment are identical to that recounted by FIGS. 4a and 4b. The results relating to the left leg are still more advantageous, notably as regards the pitch joint of the ankle, whose temperature reaches 80° C. in the first case and 48° C. in the second case, the overall increase in temperature of the left leg being 109° C. in the first case and 42° C. in the second case. Reaching a temperature of 80° C., reached under the conditions of the experiment in less than a quarter of an hour, normally entailing setting the robot to safety mode, the duration of operation of the robot is therefore very substantially lengthened by the implementation of the invention (by a factor of about 4).

FIG. 6 is a flowchart of certain steps of the command-control processing for a joint motor of a robot according to an embodiment of the invention.

To calculate the articular torques, the equation which describes the dynamic evolution of the robot is applied, to which certain simplifying assumptions are applied if appropriate, as a function of the sensors and of the calculation capability available.

By applying the general principles of the mechanics of rigidly interlinked bodies interacting with their environment, a person skilled in the art of robot engineering can determine a complete equation for the dynamic model of a robot by referring notably to the classical work: "*A Mathematical*

*Introduction to Robotics Manipulation*", MURRAY, Richard M., L I Zexiang and SASTRY, S. Shankar, CRC Press, 1994.

We shall write for example:

$$\tilde{M}(q)(\dot{T}-G)+N(q,\dot{q})T=L\tau+C^t(q)W$$

In the subsequent description, q is the vector consisting of the articular angles. $\dot{q}$ designates the articular velocity (time derivative of the articular angles q). The cartesian velocity of the root body is denoted Vroot and is of dimension 6. The first three components are the velocity of translation of the root body in relation to the 3 axes (x, y, z). The last three components are the rotation velocities in relation to the 3 axes (x, y, z). The vector consisting of Vroot and $\dot{q}$ is called the generalized coordinates T.

C(q) designates the transformation matrix for going between the space of the articular velocities and the space of the cartesian velocities; it is commonly called the kinematic Jacobian.

The first term on the left side of the equation conveys the effect of the moments of inertia of the bodies constituting the jointed chains.

In this term:
- $\tilde{M}$: the symmetric inertia matrix in generalized coordinates. It is calculated on the basis of the matrix M as well as of C(q), $\tilde{M}=C(q)^t MC(q)$. This matrix depends on the articular configuration of the robot (q); it must be updated each time that one or more joints move. $\tilde{M}$ is a square matrix of dimension $\dim(\tilde{M})=(6+6\times n_{dof}, 6+6\times n_{dof})$ where $n_{dof}$ is the number of degrees of freedom of the robot. In the case of NAO there exists 23 dof, the dimension of the matrix $\tilde{M}$ will be $(6+6\times 23)^2$, i.e. 20,736 values;
- G is the acceleration due to gravity expressed in generalized coordinates.

The second term on the left hand side of the equation conveys the effect of the Coriolis and centrifugal forces undergone by the system. $N(q,\dot{q})$ is the matrix associated with these effects.

The first term on the right hand side of the equation conveys the effect of the articular torques:
- $\tau$ is the vector of the articular torques, of dimension $\dim(\tau)=(n_{dof}, 1)$; $\tau$ is the sum of the actuation torque and of the articular friction torque;
- L is the matrix making it possible to express $\tau$ in generalized coordinates.
- W is the matrix of the wrenches of loads applied to each of the bodies constituting the robot expressed in their own reference frames; W is in general decomposed into $W_{contact}$ which is the wrench related to the contacts of the bodies with the exterior environment and $W_{perturbation}$ which is the wrench related to exterior perturbations.

In one embodiment, the model is simplified by not calculating at this juncture the inherent accelerations ($\dot{T}$) and the Coriolis and centrifugal forces ($N(q,\dot{q})$), as well as the torques of the articular friction and of the external perturbations ($W_{perturbation}$). These effects and are taken into account, as explained further on, by an offset.

The simplified dynamic model may therefore be written:

$$-\tilde{M}(q)G=L\tau+C^t(q)W_{contact}$$

The flowchart of FIG. 6 describes the calculation steps implemented to solve this equation, without having to consider this splitting as limiting, other procedures being entirely possible.

These calculation steps are reproduced with a cycle time of 20 ms.

In a step 610, a virtual ground plane is calculated on the basis of the measurements of the inertial platform. Said virtual plane is determined as being the plane normal to the gravity vector. According to the degree of reliability of the measurements of the platform, it is advantageously possible to cross-reference these measurements with a determination of the orientation of the torso by tagging of the lower bodies in contact or not with the ground.

In a step 620, the vector q is updated by virtue of the ALMemory module where the angles of the articular sensors are updated. With the aid of the matrices M it is thus possible to calculate $\tilde{M}(q)$.

In a step 630, the gravitational acceleration oriented with respect to the virtual ground plane is calculated.

In a step 640, the outputs of step 620 and 630 are combined to calculate the term $-\tilde{M}(q)G$.

In a step 650, the list of the points of contact taken into account for the calculation of the forces is calculated, said step being detailed further on in the description in conjunction with FIG. 7 and illustrated by the examples of FIGS. 8a to 8f.

Figure 9:
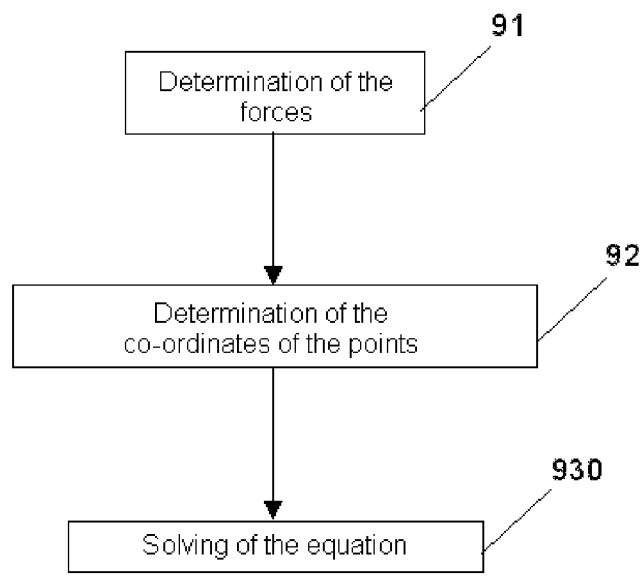
FIG. 9 is a second detail view of a step of the flowchart of FIG. 6.

In a step 660, the contact forces $W_{contact}$ are calculated, said step being detailed further on in the description in conjunction with FIG. 9.

In a step 670, $C^t(q)$ is calculated, the transpose of the transformation matrix for going between the space of the articular velocities and the space of the cartesian velocities.

In a step 680, the product of the matrix output by step 670 with the vector output by step 660 is performed.

By adding together the outputs of steps 640 and 680, the vector of the articular torques that was sought is obtained as output of step 690.

This vector can thereafter be provided as input to the module 320 for calculating the rigidity coefficients, said module optionally adding an offset taking account notably of the simplifications that will have been made of the dynamic model of the robot. In particular, if no account is taken either of the inherent accelerations, or of the Coriolis forces, or of the centrifugal forces or of the articular friction torques, it has been possible to determine experimentally that an offset of 0.25 gave good results for a robot in a standing posture, with no other interaction with its environment. When no foot of the robot is resting on the ground, it is possible to choose a lower offset, for example 0.1, thus slackening the joints of the robot and giving it a more flexible attitude.

FIG. 7 is a first detail view of a step of the flowchart of FIG. 6.

It details the sub-steps of step 650 of determining the contact points.

In the robot's configuration file, a list of characteristic points that are candidates to be contact points is defined. In the case of a humanoid robot such as NAO, the two feet, the two buttocks, the back, the head and the hand/forearm/elbow assembly will be chosen for example, without this list being limiting or it being necessary to adopt all these contact points.

These configuration data determine the list of the effectors for which the vertical distances to the virtual ground plane determined as output of step 610 will be calculated in the course of a step 710.

The contact point closest to the ground is then determined in the course of a step 720.

A detection threshold has been defined in the robot's configuration file and the other effectors which are situated in the neighborhood of the ground, within the limit of the detection threshold, are determined in the course of a step 730.

FIGS. 8a to 8f represent a robot in three postures, with determination of the contact points according to an embodiment of the invention.

FIGS. 8a, 8c and 8e represent three different postures of the robot:

In FIG. 8a, the robot is in one of the possible seated postures;

In FIG. 8c, the robot is in one of the possible standing postures;

In FIG. 8e, the robot is in a so-called "gorilla" posture.

The candidate contact points corresponding to these postures are represented respectively in FIGS. 8b, 8d and 8f.

The notation for the contact points is as follows:
RElbowRoll Both, roll joint of the right elbow;
LElbowRollBoth, roll joint of the left elbow;
RFootFR, right foot, front right sensor;
RFootFL, right foot, front left sensor;
RFootRR, right foot, rear right sensor;
RFootRL, right foot, rear left sensor.

FIG. 9 is a second detail view of a step of the flowchart of FIG. 6.

The objective of this step is to calculate the contact loads applied to NAO.

In this step, the robot is modeled by a pointlike mass interacting with its environment by contact points. All the contacts are coplanar. Moreover, to simplify the calculations, the static case is considered.

This entails solving the following equations:
sum of the forces applied to the robot (here its center of mass in the static case) vanishes, i.e.:

$$\sum_i f_i = m \cdot g$$

sum of the moments vanishes at the center of mass.

On the basis of three coplanar contact points, there is a hyperstatism of the contact loads. Indeed, there is an infinity of values of contact loads which are solutions of the above problem, notably because of the fact that: the tangential loads of the contact forces can compensate one another while complying with both equations.

To find a preferred solution, it is sought to minimize the calculated contact loads and the tangential contact forces are considered to be zero.

For each contact, only the component of force normal to the plane is considered.

We denote by $f_c(\vec{i}) = f_c(i)\vec{z}$ the force vector of contact i of NAO on its environment with $f_c(i)$ the norm of the contact force along the axis $\vec{z}$.

Consider the system to be solved:

$$\begin{bmatrix} 1 & 1 & \ldots & 1 \\ (x_1 - x_G) & (x_2 - x_G) & \ldots & (x_n - x_G) \\ (y_1 - x_G) & (y_1 - x_G) & \ldots & (y_n - x_G) \end{bmatrix} \cdot \begin{bmatrix} f_1 \\ f_2 \\ \ldots \\ f_n \end{bmatrix} = \begin{bmatrix} mg \\ 0 \\ 0 \end{bmatrix}$$

Which can be written in the simplified form:

$AY=B$

In which expression:
B is a vector sum of the vertical components of the exterior forces (no contact);
Y is the sought-after vector of the vertical components of the forces applied at the contact points selected as output of step 650;
A is a matrix whose coefficients are the coordinates of the contact points with respect to the center of mass.

The notation is as follows:
$(x_i, y_i)$ are the coordinates of the selected contact points;
$(x_G, y_G)$ are the coordinates of the center of mass;
$f_i$ is the norm of the normal force applied to contact point i and which is sought.

In the course of a step 910, the exterior forces (no contact) that the robot must balance are determined.

In the course of a step 920, the coefficients of the matrix A are calculated. Accordingly, the center of mass of the robot should be projected into the virtual ground plane determined during step 610.

Thereafter a solution Y of the equation AY=B needs to be determined in the course of a step 930.

If the number of contacts n is equal to three, we need to invert the matrix A. On condition that its determinant is non-zero, there exists a unique solution.

If n is greater than 3, an infinity of solutions is possible. We therefore need to select an algorithm for determining an optimal solution under constraint that the equation AY=B is satisfied.

It is for example possible to use a quadratic solution algorithm consisting in seeking the values of Y (and therefore of $f_i$) for which the function $$\min_y = \frac{1}{2}\|A \cdot Y - B\|_Q + \frac{1}{2}\|Y\|_R$$

is minimized on condition that Y>0.

Q and R represent optimization weights. The aim of this operation consists in minimizing the norm of AY−B with the weight Q and in minimizing the norm Y with the weight R.

FIG. 10 is a diagram of a physical and functional architecture allowing the implementation of the invention in several of its embodiments.

A robot such as NAO is advantageously endowed with high-level software allowing control of the functions of the robot in an embodiment of the invention. A software architecture of this type, dubbed NAOQI, has been disclosed notably in patent application WO2009/124955 published on 15 Oct. 2009. It comprises the basic functions for managing the communications between a robot and a PC or a remote site and for exchanging software which provide the software infrastructure necessary for the implementation of the present invention.

NAOQI is a framework optimized for robotic applications; it supports several languages, notably C++, Python and Urbi.

Within the context of the present invention, the following modules of NAOQI are particularly useful:
the ALMemory module, 1010, manages a memory shared between the various modules of NAOQI, and receives in particular the configuration elements which are loaded on initialization;
the DCM module, 1020, manages the communications with the physical robot (motors, sensors);
the ALMotion module, 1030, manages the motions of the robot; the code allowing the execution of the algorithms for implementing the invention is installed essentially in this module.

These three modules are advantageously coded in C++. The figure also indicates the data flows between modules:
- the ALMotion module 1030 recovers the sensor data (inertial platform, FSR, articular angles etc.) from the ALMemory module 1010;
- it performs the steps of calculating the rigidity coefficients of the joints and communicates the results thereof to the DCM module 1020;
- this module passes to the ALMemory module 1010 the constraint values for the articular angles which result from the application of these coefficients (at the same time as the values of the other sensors).

The examples described hereinabove are given by way of illustration of embodiments of the invention. They do not in any way limit the field of the invention which is defined by the claims which follow.

The invention claimed is:

1. A robot with capabilities of displacement on at least one jointed chain comprising:
at least one sensor of contact of an end of an at least one jointed chain with a displacement surface, said at least one jointed chain including at least one joint, said at least one joint driven by an electric motor controlled by an order determined based on a position and/or a velocity and based on limiting a current and/or a torque applied to said electric motor,
wherein said limiting is controlled as a function of the torque applied to said at least one joint, said torque being calculated as a solution of an equation modeling a dynamic equilibrium of the robot between:
a first sum of: (i) a difference of inertial forces due to an angular acceleration of the at least one joint, (ii) the gravitational acceleration, (iii) an effect of Coriolis forces, and (iv) centrifugal forces, and
a second sum of: (i) the torque, (ii) contact forces, (iii) friction forces, and (iv) perturbation forces, said torque and said contact, friction and perturbation forces being applied to said at least one joint,
wherein a part of effects of the inertial forces due to the angular acceleration of the at least one joint, effects of the Coriolis forces and centrifugal forces, and effects of the friction forces being modeled by an offset to a variable rigidity coefficient, and
wherein said friction forces are limited by the variable rigidity coefficient calculated for the at least one joint.

2. The robot of claim 1, wherein said offset varies according to a posture of the robot.

3. The robot of claim 1, wherein the effect of the gravitational acceleration is calculated based on a matrix of inertia coefficients dependent on the configuration of the robot and applied to articular angles and of gravity vector determined by combining measurements of an inertial platform of the robot.

4. The robot of claim 3, wherein for a calculation of the gravity vector, a disambiguation is carried out by determining an orientation in space of a central chain of the robot by solving for a position of effectors affixed to said central chain.

5. The robot of claim 3, wherein points of application of the contact forces taken into account in the dynamic equilibrium model of the robot are determined by generating a first list of the effectors satisfying a criterion chosen from a group of criteria comprising:
a first list of on/off states of contact sensors positioned on said effectors,
a second list of thresholds of minimum distance with respect to a virtual ground plane of said effectors and a combination of said first and second lists, said criteria being substantially determined by a morphology of the robot.

6. The robot of claim 5, wherein the effectors of the first list of on/off states are filtered into a third list by comparing a current posture of the robot with standard postures stored in robot configuration data, said standard postures determining a standard list of effectors, said third list comprising only the effectors of the third list corresponding to the standard posture adopted as closest to the current posture of the robot according to a similarity criterion, when it exists.

7. The robot of claim 3, wherein the contact forces at points of application are determined by searching for a substantially optimal solution to the equation modeling the dynamic equilibrium between a third sum of said contact forces and a weight of the robot, and of a vertical component of the perturbation forces.

8. The robot of claim 7, wherein the perturbation forces are neglected for the substantially optimal solution.

9. The robot of claim 1, wherein the variable rigidity coefficient of the at least one joint is calculated by dividing the torque calculated for the at least one joint by a maximum torque defined for the robot.

10. The robot of claim 9, wherein the maximum torque defined for the robot is modified as a function of a temperature measured at a measurement point on the robot.

11. A method comprising:
limiting a torque and/or a current applied to an electric motor for driving a joint of a robot with capabilities of displacement on at least one jointed chain including at least one sensor of contact of an end of said at least one jointed chain with a displacement surface, said at least one jointed chain comprising at least one joint, said electric motor being controlled by a command based on a position and/or a velocity,
wherein said limiting takes place by determining a calculated torque value applied to said at least one joint, said torque being calculated as a solution of an equation modeling a dynamic equilibrium of the robot between:
a first sum of: (i) a difference of inertial forces due to an angular acceleration of the at least one joint, (ii) the gravitational acceleration, (iii) an effect of Coriolis forces, and (iv) centrifugal forces, and
a second sum of: (i) the torque, (ii) contact forces, (iii) friction forces, and (iv) perturbation forces, said torque and said contact, friction and perturbation forces being applied to said at least one joint,
wherein a part of effects of the inertial forces due to the angular acceleration of the at least one joint, effects of the Coriolis forces and centrifugal forces, and effects of the friction forces being modeled by an offset to a variable rigidity coefficient, and
wherein said friction forces are limited by the variable rigidity coefficient calculated for the at least one joint.

12. A non-transitory tangible computer readable medium comprising computer program including program code instructions thereupon configured to be executed on a computer, said code instructions being executed by a processor for:
limiting a torque and/or a current applied to an electric motor for driving a joint of a robot with capabilities of displacement on at least one jointed chain including at least one sensor of contact of an end of said at least one jointed chain with a displacement surface, said at least one jointed chain comprising at least one joint, said electric motor being controlled by an order based on a position and/or a velocity, said code instructions comprising code instructions for limiting the torque and/or the current applied to said electric motor, wherein said limiting code instructions are configured to execute said limiting as a function of the torque applied to said at least one joint, said torque being calculated as a solution of an equation modeling a dynamic equilibrium of the robot between:

a first sum of: (i) a difference of inertial forces due to an angular acceleration of the at least one joint, (ii) the gravitational acceleration, (iii) an effect of Coriolis forces, and (iv) centrifugal forces, and a second sum of: (i) the torque, contact forces, (iii) friction forces, and (iv) perturbation forces, said torque and said contact, friction and perturbation forces being applied to said at least one joint, wherein a part of effects of the inertial forces due to the angular acceleration of the at least one joint, effects of the Coriolis forces and centrifugal forces, and effects of the friction forces being modeled by an offset to a variable rigidity coefficient, and wherein said friction forces are limited by the variable rigidity coefficient calculated for the at least one joint.

* * * * *